(12) United States Patent
Dickinson

(10) Patent No.: US 11,871,709 B2
(45) Date of Patent: Jan. 16, 2024

(54) PLANT GROWTH STIMULATION DEVICE AND METHOD

(71) Applicant: Terry Dickinson, Fletcher, NC (US)

(72) Inventor: Terry Dickinson, Fletcher, NC (US)

(*) Notice: Subject to any disclaimer, the term of this patent is extended or adjusted under 35 U.S.C. 154(b) by 0 days.

(21) Appl. No.: 17/811,922

(22) Filed: Jul. 12, 2022

(65) Prior Publication Data

US 2023/0011339 A1 Jan. 12, 2023

Related U.S. Application Data

(60) Provisional application No. 63/220,664, filed on Jul. 12, 2021.

(51) Int. Cl.
*A01G 17/04* (2006.01)
*A01G 22/00* (2018.01)
*A01G 9/12* (2006.01)

(52) U.S. Cl.
CPC .............. *A01G 22/00* (2018.02); *A01G 9/122* (2013.01)

(58) Field of Classification Search
CPC .......... A01G 9/12; A01G 9/122; A01G 17/04; A01G 17/06; A01G 17/14; A01G 22/00; A01G 17/02; D06F 95/002; A45C 7/0077
USPC ................................... 47/4, 42–47
See application file for complete search history.

(56) References Cited

U.S. PATENT DOCUMENTS

| | | | | |
|---|---|---|---|---|
| 4,361,982 A | * | 12/1982 | Horowitz | A01G 9/12 248/219.2 |
| 5,647,166 A | * | 7/1997 | Neff | A01G 9/12 47/45 |
| 6,810,618 B1 | * | 11/2004 | Hauser | A01G 13/043 47/29.6 |
| 11,178,825 B2 | * | 11/2021 | Ahl | A01G 9/12 |
| 11,304,385 B1 | * | 4/2022 | Buss | A01G 13/043 47/29.6 |
| 2007/0266625 A1 | * | 11/2007 | Markis | A01G 13/10 47/29.6 |
| 2011/0113684 A1 | | 5/2011 | Morgan | |
| 2011/0197505 A1 | * | 8/2011 | Hansen | A01G 9/12 47/46 |
| 2015/0101248 A1 | | 4/2015 | Adkinson | |
| 2015/0223411 A1 | | 8/2015 | Toye et al. | |

(Continued)

FOREIGN PATENT DOCUMENTS

| | | | | |
|---|---|---|---|---|
| CN | 205030248 U | | 2/2016 | |
| CN | 105493922 A | * | 4/2016 | ............... A01G 7/06 |
| CN | 110972768 A | | 4/2020 | |

OTHER PUBLICATIONS

ISA/US; International Search Report and Written Opinion for International Patent Application No. PCT/US2022/073621 dated Sep. 7, 2022, 11 pages.

*Primary Examiner* — Peter M Poon
*Assistant Examiner* — Danielle A Clerkley
(74) *Attorney, Agent, or Firm* — NK Patent Law

(57) ABSTRACT

This invention provides a low stress training device and method for growing a plant from the Cannabaceae family. The device comprises a mast and a cultivator moveably attached to the mast such that the cultivator may be fixed into a variety of positions along the mast. The method for using the device in a low stress training process leads to increased size, quality, and quantity of colas on plants from the Cannabaceae family through stimulating cytokinin and auxin development.

13 Claims, 4 Drawing Sheets

(56) References Cited

U.S. PATENT DOCUMENTS

| | | | |
|---|---|---|---|
| 2016/0135385 A1* | 5/2016 | Wang | A01G 9/12 47/44 |
| 2018/0064038 A1* | 3/2018 | Niccoli | A01G 9/12 |
| 2018/0153108 A1* | 6/2018 | Villeneuve | A01G 9/124 |
| 2019/0037779 A1 | 2/2019 | Chirco | |

* cited by examiner

PLANT GROWTH STIMULATION DEVICE AND METHOD

CROSS-REFERENCE TO RELATED APPLICATIONS

This application is related to and claims right of priority to U.S. Provisional Patent Application No. 63/220,664 filed on Jul. 12, 2021, by Terry Dickinson, entitled "PLANT GROWTH STIMULATION DEVICE AND METHOD," the entire contents of the above application is incorporated herein by reference in its entirety.

FIELD OF THE INVENTION

The invention generally relates to a plant growth stimulation device and method for using the same.

BACKGROUND

Plants in the Cannabaceae family have well-recognized commercial value for their many uses and applications, particularly with respect to the flowers or cola found on female plants. With the passage of the Hemp Farming Act of 2018, the United States legalized commodity hemp production at the federal level. There are many uses for hemp, from use as fiber for fabric and rope making to dietary supplements and beauty products.

At the time of the filing of this application, the United States House of Representatives has passed a bill to remove *cannabis* from the Controlled Substances Act, which would allow for the farming and sale of *cannabis* across the country. Currently, thirty-seven states, three permanently inhabited U.S. territories, and the District of Columbia permit medical use of *cannabis*. Of these, eighteen states, the District of Columbia, and two territories permit recreational use of *cannabis*. Commercial distribution of *cannabis* has been legalized in all jurisdictions where possession has been legalized except the District of Columbia.

Cannabinoids are derived from *Cannabis sativa* or *Cannabis* indica plants. These compounds are cyclic molecules, allowing them to easily cross the blood-brain barrier and causing few side effects to users. The cannabinoids receiving the greatest attention are 4-9-tetrahydrocannabinol (THC) and cannabidiol (CBD). Both are associated with medical benefits such as treatment of pain, nausea, allergies, infection, depression, migraine, bipolar disorders, hypertension, epilepsy, fibromyalgia, autoimmune disorders, and many other conditions.

Presently Cannabaceae plants are generally cultivated in large-scale greenhouses with automatic watering systems and artificial lighting. Such methods have a high cost of production, which means that productivity and quality are vital in managing a successful operation. It is widely appreciated that naturally occurring plant hormones are necessary for the development of the plants with particular hormones being necessary for certain types of growth. Two of the best-known plant hormones are cytokinins and auxins. Cytokinins promote cell division, cell enlargement, and differentiation and control the number of stems that grow from a main stalk. If the production of cytokinin is increased, then a Cannabaceae plant is able to grow a greater number of stems from its main stalk and, thus, a greater number of colas. Auxins promote cell division and elongation and control the size of colas that develop on a Cannabaceae plant. If the production of auxin is increased, then a Cannabaceae plant is able to grow larger colas.

There are a number of chemical fertilizers capable of stimulating a plant's development and even target specific types of plant hormones for production beyond what an uncultivated plant may produce. Chemical nutrients may leave residue on the plants, which may impact the appearance, flavor, or aroma. To the extent to which these chemicals are applied to plants growing in soil, the soil itself may be negatively impacted. While such chemicals are used on a wide variety of plants, there is a reluctance to apply chemicals to plants in the Cannabaceae family in view of the typical uses of such plants. Accordingly, cultivation methods encouraging the natural production of desirable plant hormones are highly desirable. There are many such methods known for cultivating Cannabaceae plants to increase the yield of such plants, such as topping, fimming (FIM), and low-stress training. Still there remains room for improvement in cultivation methods. The device and methods described herein address this need.

One method of training plants to get higher yields is "Scrog" or screen of green. Generally, scrogging setups include sets of fencing running parallel to get each other. Plants will grow through the fencing material and are grown over and under the wire away from the plant in several directions. As the plant grows, the branches and bud (flowers) producing sites are spread out and exposed to better lighting conditions. The buds are helped upright and separated by fencing material. Once the scrog method is underway, the fencing is not moved because the branches are woven through and around screen material and moving the fencing would damage the branches. This prevents growers from being able to adjust the fencing to adapt to a plant's growth, thereby limiting the growth potential of the plant. Additionally, scrogging results in the plant growing in a horizontal manner and decreases the quantity of bud-producing sites per square inch.

DETAILED DESCRIPTION OF THE DRAWINGS

Figure 1:
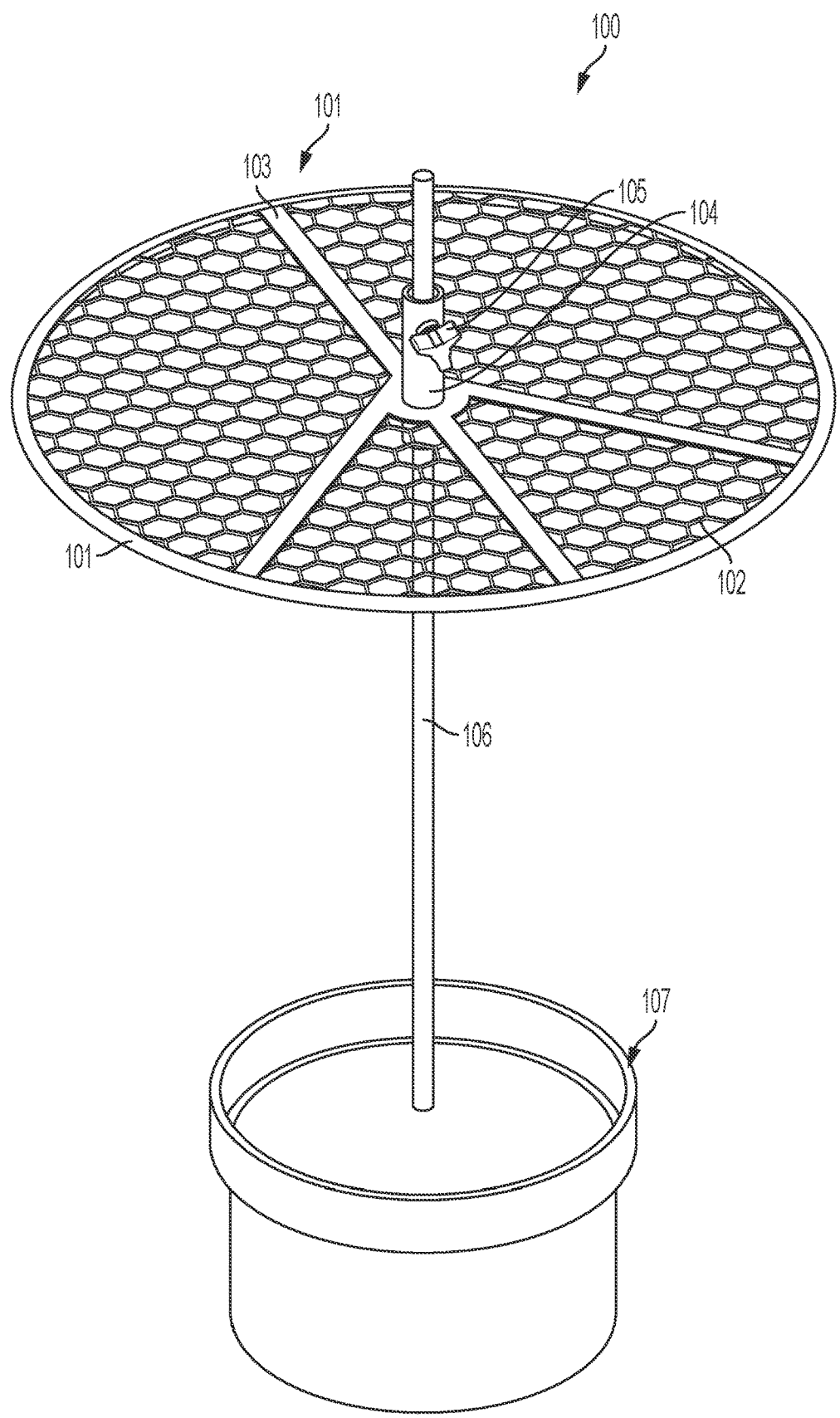
FIG. 1 depicts an embodiment of a plant growth stimulation device.
Figure 2:
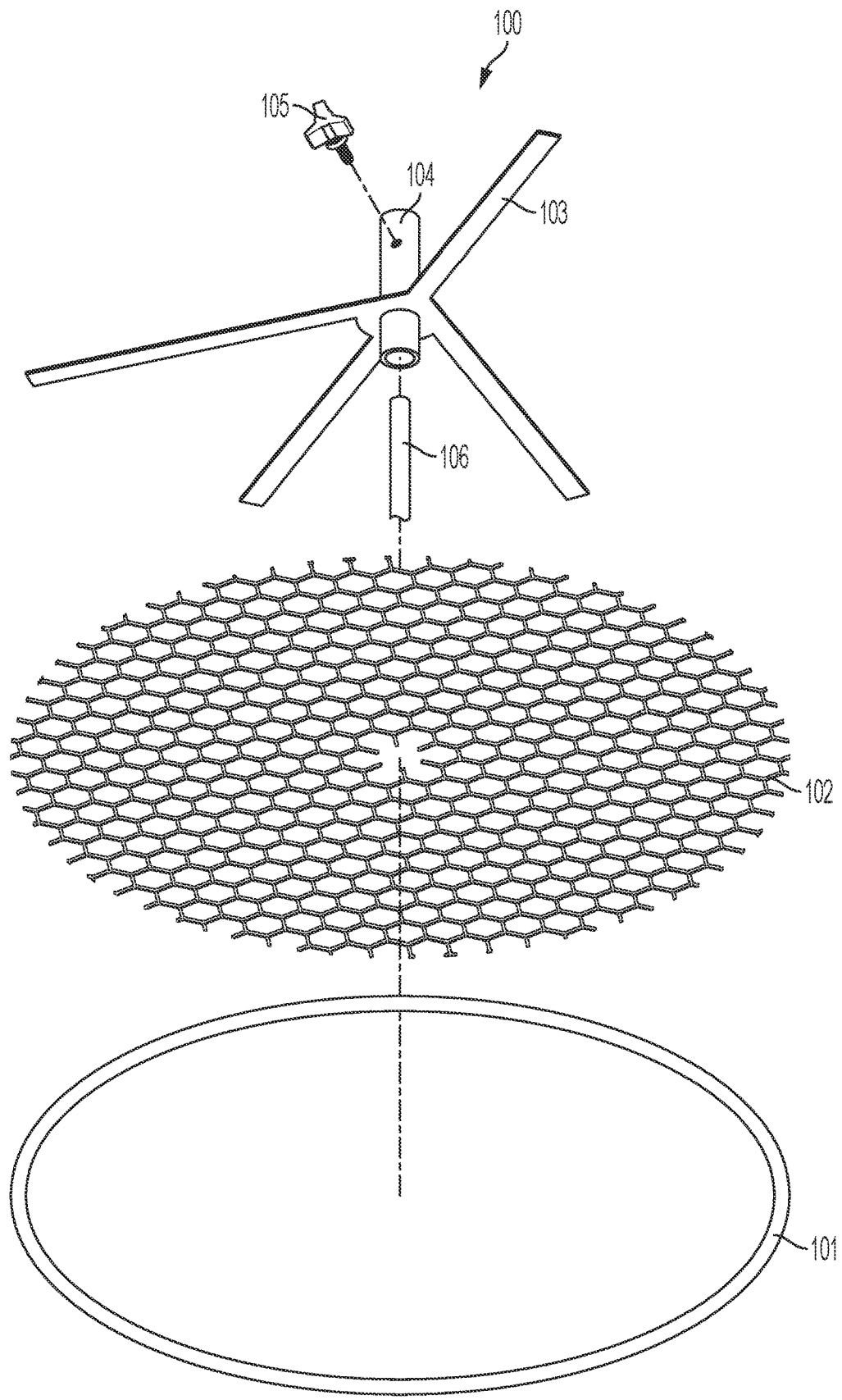
FIG. 2 depicts an exploded view of the cultivator of one embodiment of a plant growth stimulation device.
Figure 3:
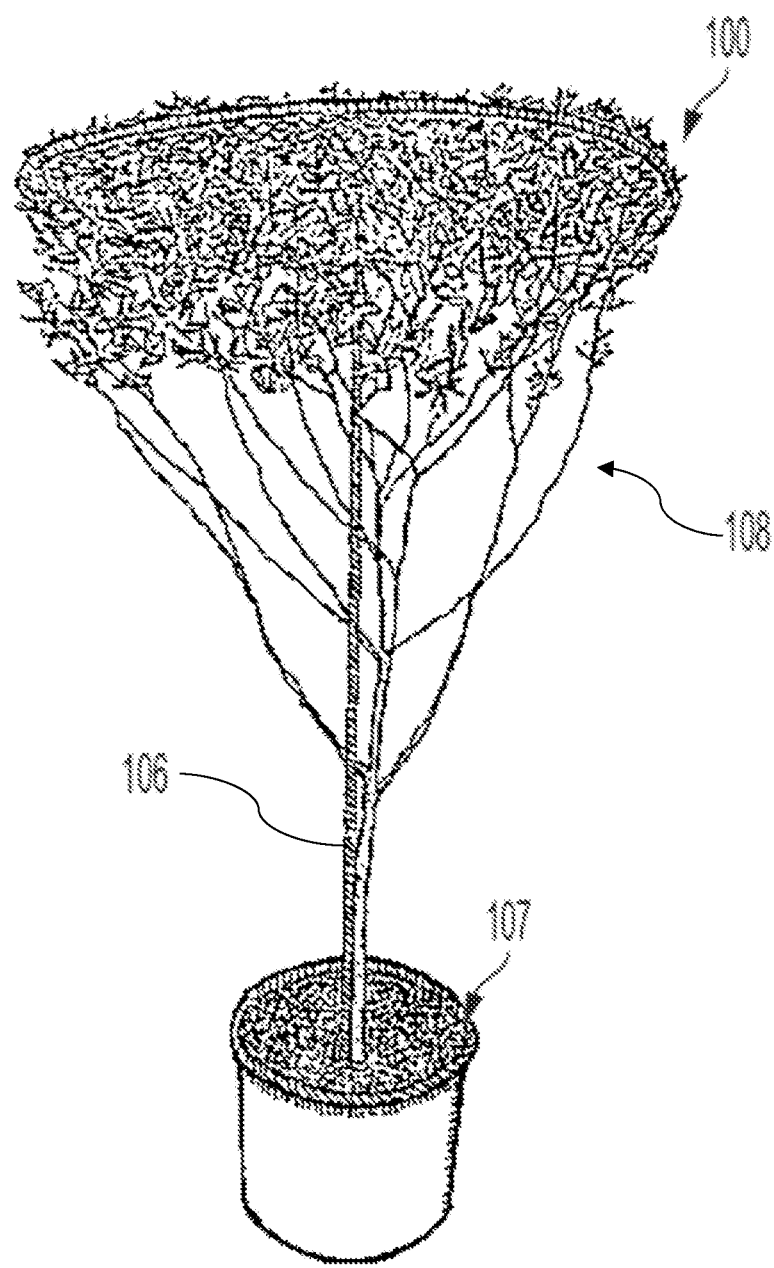
FIG. 3 depicts an embodiment of a plant growth stimulation device utilized with a plant.

An embodiment of a plant growth stimulation device is illustrated in FIGS. 1-3. Referring to such figures, the device is comprised of a cultivator 100 affixed to a mast 106.

The cultivator 100 comprises a frame 101, netting 102, a brace 103, a cultivator shaft 104, and a knob screw 105. Alternatively, in one embodiment, the cultivator does not include a shaft or a mast. In the embodiment depicted in FIG. 1, the frame 101 generally comprises a hollow ring having an outside edge or shoulder that wraps into top and bottom sidewalls of the frame 101. The hollow ring may be injected molded from flexible, resilient polymer-based compounds or a composite (e.g., polyvinyl). The edges of the sidewalls may then extend to a bead, which allows the frame 101 to secure within it the netting 102 and the brace 103. Alternatively, the frame includes an inner lip designed to receive the netting and the brace. The outside ring 101 extends downward to form a lip on the underside of the device. This lip design is an aid in holding growing tips under the device. In one embodiment, the frame is a substantially circular shape. Alternatively, the frame is a rectangular shape, a triangular shape, and/or other polygonal or curved shapes. In a preferred embodiment, the circular shape of the frame has the added benefit of lacking sharp corners that might damage a plant 108 coming into contact with the frame 101.

The cultivator shaft 104 is sized to be able to fit over the outside edge of the mast 106 and is affixed to the brace 103. The brace 103 provides a means for attaching the cultivator shaft 104 to the frame 101 while holding the netting 102 in position within the frame 101. The depicted brace 103 comprises four arms extending from the cultivator shaft 104 that, when viewed together with the frame 101, form a peace sign. Other configurations of the brace 103, with fewer or more arms and in other shapes, whether decorative or purely functional, would be equally as suitable. For example, and not limitation, in one embodiment, the brace includes at least two arms. In another embodiment, the brace includes at least four arms. In the embodiment depicted in FIG. 1, the distal ends of the arms of the brace 103 are slipped within the hollow interior of the frame 101 and frictionally held in place by the bead or the lip along the interior edge of the frame 101. In other embodiments, the brace 103 may be attached to the frame 101 by other means, including a permanent attachment in some embodiments.

The netting 102 is a section of garden netting shaped to fit within the frame 101 of the cultivator 100. The exterior edge of the netting 102 may be secured within the hollow interior of the cultivator 100, being frictionally held in place by the bead or the lip along the interior edge of the frame 101. In other embodiments, the netting 102 may be attached to the frame 101 by other means, including a permanent attachment in some embodiments. The netting 102 may also be attached to one or both of the cultivator shaft 104 and the brace 103. In one embodiment, the netting includes 1⅛" openings in the plastic netting material designed to keep the growth tips from growing through the netting. Additionally, the netting openings are important for holding and laying the top of the plant down. In another embodiment, the openings in the netting are 1.5 inches across and round.

In a preferred embodiment of device 100, the plastic netting material 102 could be large enough to let the maximum amount of light through but small enough (e.g., about 1"×1") to keep vegetation from growing through the plastic netting material 102. In another embodiment, the plastic netting material 102 can be round and about ¹⁄₁₆" in diameter so as not to damage tender new vegetation. The plastic netting material 102 can be hexagonal in shape to let a maximum amount of light pass through. The plastic netting material 102 in another embodiment could also be clear or frosted to allow for more light passage. The plastic netting material 102 of plant growth stimulating device 100 is flexible. For example, and not limitation, the plastic netting material is designed to apply gentle pressure over a period of time to move the growing tips down to a 90-degree angle.

The frame 101 shall be manufactured of material having sufficient rigidity to securely hold in place the netting 102 and provide sufficient support for the cultivator 100 to be used to bend the top of a plant 108 as more particularly described below. Such material may be flexible or entirely rigid; a variety of plastic, rubber, or metal would be suitable. In some embodiments, the frame 101 may be manufactured as a single unitary piece without ends, a single unitary piece with ends that may be joined together for use, or multiple segments that may be secured together to form a unitary piece once combined. The brace 103 and cultivator shaft 104 shall be manufactured of substantially rigid material, which may be the same material or different materials. The brace 103 and cultivator shaft 104 may be manufactured separately or injection molded such that both are formed in a unitary piece. The netting 102 shall be manufactured of material that has some flexibility (e.g., plastic). Vinyl and nylon may be particularly good options for this application and may be opaque or transparent, with transparent options allowing for a greater amount of light to pass through.

In one embodiment, the frame has a diameter of about twenty inches. The netting includes a plastic material. In another embodiment, the netting does not include metal. In yet another embodiment, the frame is a square shape. The square shape includes a length of about twenty-four inches and a width of about twenty-four inches. Advantageously, in one embodiment, the square shape cultivator is operable to cover a plurality of plants.

In another embodiment, the cultivator is operable to receive a hydroponic component. For example, and not limitation, the hydroponic component includes a water filter, tubing, an adapter, a net pot, and other similar hydroponic components.

As depicted in FIGS. 1 and 3, the mast 106 of the plant growth stimulation device shall be a pole having a top end and a bottom end, with the bottom end being set in a planter 107. The cultivator 100 may be adjustably attached to a mast 106 such that the cultivator 100 may be raised or lowered along the length of the mast 106. The cultivator 100 may be held in place on the mast 106 by a variety of means. The embodiments depicted in FIGS. 1-2 show a knob screw 105 designed to attach the cultivator 100 to the mast 106 by a friction fit. The knob screw 105 comprises a screw with a knob on its proximal end. In this instance, the knob of the knob screw 105 may be rotated to cause the screw portion to fit through an opening in the cultivator shaft 104 and cause the distal end of the knob screw 105 to abut the mast 106. When sufficient force is applied, the knob screw 105 shall be held in place against the mast 106 to support the cultivator 100 in a fixed position. When it is desirable to change the location of the cultivator 100, the knob screw 105 may be rotated in the opposite direction to remove the pressure between the knob screw 105 and the mast 106 and allow the cultivator 100 to be moved to a different position or entirely removed from the mast 106. Other fasteners may be used with equal effectiveness, such as a clamp, a clip, or a screw or bolt that passes through a hole within the mast.

For example, and not limitation, the growth stimulation device is designed to affect the making and releasing of plant growth hormones auxin, cytokinin, and gibberellins. The growth stimulation device is designed to apply pressure to a top of a plant via the netting. By pressing down on the tops, the auxins move down. By turning the device to the left or right, the auxins are moved back and forth to create more space for the plant branches. As a result, the auxins produce growth hormones in the cola area. The cola area enlarges and elongates as a result of this process.

The height of the cultivator device is adjusted such that the netting applies pressure to the growing tips of the plant. In one embodiment, the top of the plant is bent at approximately a ninety-degree angle in relation to the mast.

When the top of this plant is stopped from growing upwards the plant releases growth hormones to the growing tips below that are not in a blocked condition. The tips will grow to the top of the plant in about 3 weeks' time using the device as directed. Any growing tips not at the top can be cut at this time. Also, the vegetation from the bottom 90% of the plant should be removed at this time. This helps the plant overcome the blocked condition by dividing the single growing tips into many growing tips. Cytokinin works by dividing the cells in the top five inches of the plant and duplicating the flower/cola producing area on the plant.

In another embodiment, the frame, netting, and brace are removably attached to the mast. Advantageously, this enables the frame, netting, and brace to be removed when the plant needs to continue growing in a vertical direction. In yet another embodiment, the frame, netting, and brace are separately removably. In one embodiment, the frame, netting, and brace are attached to the mast via a hinge joint. The frame, netting, and brace are configured to move between a folded position and an unfolded position. In the unfolded position, the frame, netting, and brace are operable to apply pressure to the entire top of the plant. In the folded position, the frame, netting, and brace are positioned away from the plant to enable vertical growth. For example, and not limitation, the hinge joint is positioned proximately in the center of the frame. The frame includes two separate portions on each side of the hinge joint. Each portion of the frame is designed to fold upwards (e.g., butterfly wings). Alternatively, the frame is attached to at least two hinge joints and each hinge joint is positioned on opposite sides of the mast. Each half of the frame is operable to move from an unfolded position to a folded position. In another embodiment, the growth stimulation device includes a ball joint at the top of the mast. The frame and brace are attached to the ball joint. Advantageously, the ball joint enables the frame, the netting, and the brace to rotate to any side of the mast. The ball joint further enables the frame, the netting, and the brace to be positioned at an angle relative to the length of the plant.

Figure 4:
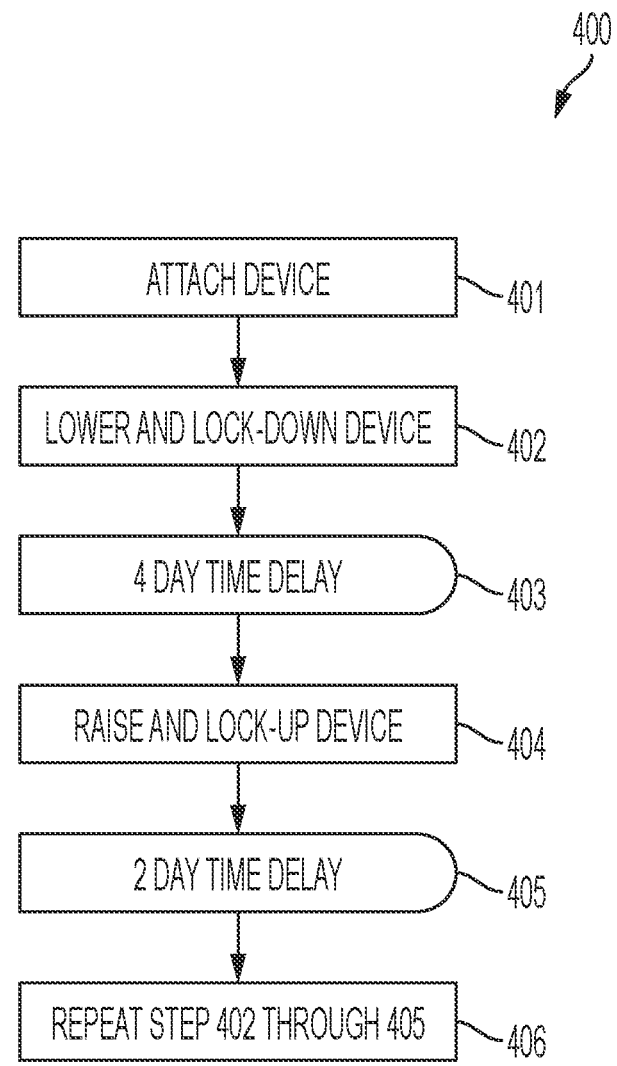
FIG. 4 depicts a flowchart of a method for using a plant growth stimulation device.

The plant growth stimulation device may be used in a variety of manners. FIG. 4 describes a specific method of use, a new process of low-stress training, which is particularly useful in connection with increasing the size and quality of the colas of female plants in the Cannabaceae family. Forcing the stems of such plants to bend causes the plant 108 to grow more bud sites, which in turn leads to the development of more colas. The method described herein leads to the development of the plant 108 having a greater number of colas that are significantly larger in size as compared to plants cultivated employing other low stress training techniques. References shall be made herein to the steps identified in FIG. 4 and the plant growth stimulation device as depicted in FIGS. 1-3.

As the plant 108 is growing, some pre-training may be desirable. For example, and not limitation, the top of the main stalk may be tied down to bend the plant into an arch. This would allow the lower branches to receive more light and grow in length. It may also be desirable to incorporate the well-known practices of topping and/or fimming to increase the number of colas and/or stems from the main stalk. Once the main stalk of the plant 108 has reached between about 10 inches to about 24 inches in height and prior to flowering, the mast 106 is secured within a planter 107 containing a plant 108 and attaching the cultivator 100 is attached to the mast 106. Next, the device 402 is lowered and locked down by sliding the cultivator 100 down the mast 106 and securing it in a position such that the netting 102 forces the main stalk and stems within the top portion of the plant 108 to bend. A substantial majority of the plant 108 is held down by the cultivator 100 so that it is principally parallel to the soil from which the plant 108 grows. The branches of the plant 108 are rearranged as the plant is bent under the cultivator 100 or simply allowed to remain wherever the cultivator 100 positions the branches as the cultivator is lowered directly onto the plant 108 or turned in a clockwise or counterclockwise direction to provide some guidance in positioning the plant 108. There is then a 4-day time delay 403 during which the plant 108 is held in this bent position.

Next, the plant growth stimulation device is raised and put into a locked position. The cultivator 100 is lifted so that the cultivator does not touch the plant 108. After a 2-day time delay 405 allowing for a straightening period during which time the plant 108 shifts its focus to upward growth. Steps 402-406 are repeated, and the cultivator 100 is lowered again causing the plant 108 to be bent for a second 4-day bending period and then allowed to straighten for a second 2-day straightening period. The plant 108 will likely return to the position it was in during the previous bending period and the branches may be rearranged in a different position. In one embodiment, the process further includes using a light schedule from 18-24 hours a day of light to at least 12 hours of darkness in 24 hours.

Variations of this process will provide similar results. For example, and not limitation, repeating the process of steps 402-405 through one, two, or many more iterations. The length of the bending and straightening periods may also be modified. It may be desirable to have a first training period wherein the bending process is implemented exactly as described in FIG. 4, which will encourage increased production of cytokinins, leading to cell division within the plant 108 and causing the plant 108 to grow additional branches. It may then be desirable to have a second training period wherein the bending process involves the opposite of the schedule as described in FIG. 4, namely, bending the plant 108 for just 2 days at a time and lifting the cultivator 100 off the plant 108 for 4 days at a time. In this type of training period, auxin production will increase, causing the colas of the plant 108 to lengthen.

Once the desired number and size of colas have developed on the plant 108, the cultivator 100 is lifted away from the plant 108 to allow the colas to flower. The colas of the plant 108 will then flower and may be harvested as desired. For example, and not limitation, at 45 days of using the plant growth stimulation device, all plant vegetation should be removed except for the top 3-5" of each tip.

In yet another embodiment, a process of using the growth stimulation device includes installing a stake in an area proximate to a targeted plant. The stake is positioned in a parallel direction to the plant stem. The growth stimulation device includes a hole in the center and lines up with the stake. The growth stimulation device is pressed downward until it makes contact with the tops of the plant. The growth stimulation device is locked in this position for four days. Then, the device is unlocked and moved upward and away from the plant. The growth stimulation device is maintained in a noncontact position for two days, then pressed against the plant for three days, then moved to a noncontact position for two days, then pressed down for three days, then moved to a noncontact position for two days, then pressed down for three days, then moved to a noncontact position for four days. The growth stimulation device is then positioned to make light contact with the tops of the plant. The growth stimulation device is rotated a quarter-turn to the right and locked for two days. In another embodiment, the growth stimulation device is locked for three days. In yet another embodiment, the growth stimulation device is locked for four days. Then the growth stimulation device is positioned in a noncontact position for two days, then positioned in a locked-down position with a quarter turn to the left for three days ("Step 13"). The growth stimulation device is moved to a noncontact position and locked for two days ("Step 14"). Steps 13 and 14 are repeated five to seven times. The device is then removed from the plant and the plant receives at least twelve hours of uninterrupted darkness every 24 hours.

In yet another embodiment, the present invention includes removing the single growing tip of the plant. The plant will divide at this location and now there will be two growing tips on top. Then, the plant is allowed to grow for a time. For example, and not limitation, the plant is allowed to grow for about thirty days. Next, the two growing tips are removed so the plant will divide at each growing tip to create a total of four growing tips on top. Then, at least one tip of the four growing tips is removed and then the plant is allowed to recover and grow to a desired size.

Throughout this process, plants subjected to the training will require light, water, and nutrition sufficient to support continued growth.

FIG. 4 is a process flow chart 400 illustrating steps for using plant growth stimulation device of FIG. 1. At step 401, the plant growth stimulation device 100 of FIG. 1 is attached to the top of the plant stake support and put in a locked position.

At step 402, the plant growth stimulation device is unlocked and lowered down to make contact with the growing tips of the plant. The growth stimulation device is rotated a few inches to the right while continuing to apply firm flexible downward pressure. Then, the growth stimulation device is put in a locked position. The tallest grow tips are folded down to approximately a 90-degree angle.

At step 403, the growth stimulation device remains in a locked down position for a 4-day time period. At step 404, the device is raised and put into a locked position. Step 405 includes a 2-day time period in the locked position. This allows for the grow tips to return to normal vertical growth. Steps 402-405 are repeated for the next 45-65 days.

Those skilled in the art will recognize that modifications and adaptions to the device and methods described herein are possible without departing from the intended scope of such device and methods. Many variations and modifications may be affected within the spirit and scope of the device and methods as described in the appended claims. The component parts and steps of use described herein need not be performed in the order described, and component parts and steps may be added or omitted.

The invention claimed is:

1. A plant blocking device for limiting vertical growth of a plant consisting of:
   a mast;
   a circular frame including an exterior top surface and an exterior bottom surface, wherein the exterior top surface and the exterior bottom surface of the frame curve inward toward a middle of an interior of the frame to form a lip, wherein the frame lip is positioned along an entire circumference of the circular frame;
   a netting;
   a unitary brace with a plurality of brace elements, wherein each brace element of the plurality of brace elements is attached to the frame, wherein the unitary brace is positioned on top of the netting;
   a cylindrical shaft positioned around the mast and extending through the unitary brace and the netting; and
   an adjustment mechanism;
   wherein the unitary brace and the frame are integrally formed;
   wherein the unitary brace and the netting are positioned in the frame lip;
   wherein the adjustment mechanism includes a locked position and an unlocked position, wherein in the locked position, the adjustment mechanism applies pressure to the mast and to the shaft;
   wherein the adjustment mechanism adjusts a height of the frame, the brace, and the netting;
   wherein, when the adjustment mechanism is in the locked position, the shaft is not movable along a length of the mast; and
   wherein, when the adjustment mechanism is in the unlocked position, the shaft is movable along the length of the mast.

2. The plant blocking device of claim 1, wherein the plurality of brace elements includes a first brace element, a second brace element, a third brace element, and a fourth brace element, wherein the first brace element, the second brace element, and the third brace element are connected to the frame lip on a first half of the frame and the shaft, wherein the fourth brace element is connected to the frame lip on a second half of the frame and the shaft, wherein the second half of the frame is on an opposite side of the first half of the frame relative to the mast.

3. The plant blocking device of claim 1, wherein the adjustment mechanism includes a knob screw, wherein the knob screw fits through an opening in the shaft, wherein, when the adjustment mechanism is in the locked position, the knob screw contacts the mast.

4. The plant blocking device of claim 1, wherein the netting includes a pattern, wherein the pattern includes a plurality of openings, wherein each opening of the plurality of openings includes a diameter of about 1 and $1\frac{1}{8}^{th}$ inch.

5. The plant blocking device of claim 1, wherein the frame, the brace, and the netting are rotatably positioned around the mast, wherein, when the adjustment mechanism is in the unlocked position, the frame, the brace, and the netting are movable in a clockwise motion and/or a counterclockwise motion relative to the mast.

6. A plant blocking device for limiting vertical growth of a plant consisting of:
   a mast;
   a circular frame;
   a netting comprising a plurality of holes, wherein the plurality of holes are hexagonal shaped, wherein each hole of the plurality of holes includes a diameter of about 1 and $1\frac{1}{8}^{th}$ inch;
   a cylindrical shaft positioned around the mast;
   a brace including a plurality of brace elements, wherein the brace is a unitary piece, wherein the brace is positioned on top of the netting, wherein the plurality of brace elements is connected to the shaft and the frame, wherein the plurality of brace elements includes a first brace element, a second brace element, a third brace element, and a fourth brace element, wherein the frame is a circular shape, wherein the first brace element, the second brace element, and the third brace element are connected to a first side of an interior surface of the frame, and the shaft, wherein the fourth brace element is connected to a second side of the interior surface and the shaft, wherein the second side of the frame is on the opposite side of the frame relative to the first side of the frame;
   wherein the cylindrical shaft extends through the brace and the netting; and
   an adjustment mechanism;
   wherein the frame receives the netting and the brace;
   wherein the adjustment mechanism includes a locked position and an unlocked position, wherein in the locked position, the adjustment mechanism applies pressure to the mast and to the shaft;

wherein the adjustment mechanism adjusts a height of the frame, the brace, and the netting;

wherein, when the adjustment mechanism is in the locked position, the shaft is not movable along a length of the mast; and wherein, when the adjustment mechanism is in the unlocked position, the shaft is movable along the length of the mast.

7. The plant blocking device of claim 6, wherein the frame includes an exterior top surface and an exterior bottom surface, wherein the exterior top surface and the exterior bottom surface of the frame curve inward to form a lip, wherein the lip receives the brace and the netting.

8. The plant blocking device of claim 6, wherein the adjustment mechanism includes a knob screw, wherein the knob screw fits through an opening in the shaft, wherein the knob screw contacts the mast.

9. The plant blocking device of claim 6, wherein, when the adjustment mechanism is in the locked position, the netting, the brace, and the shaft are in a locked position, wherein, when in the locked position, the netting, the brace, and the shaft are not movable along the mast.

10. The plant blocking device of claim 6, wherein the brace and the shaft are integrally formed.

11. The plant blocking device of claim 6, wherein the shaft is affixed to the brace.

12. A plant blocking device for limiting vertical growth of a plant consisting of:
 a circular frame;
 a netting attached to the frame, wherein the netting includes a plurality of shapes, wherein the plurality of shapes are hexagonal shapes;
 a shaft;
 a brace positioned on top of the netting, wherein the brace is a unitary piece, wherein the brace includes a plurality of brace elements;
 a mast; and
 an adjustment mechanism;
 wherein the frame is a hollow ring including an exterior edge, wherein the exterior edge of the frame wraps from a top surface and a bottom surface of the frame to form a lip, wherein the lip receives the brace and the netting, wherein the top surface of the frame extends above the netting, wherein the bottom surface of the frame extends below the netting;
 wherein the netting includes a pattern of shapes;
 wherein the shaft wraps around the mast;
 wherein the shaft further includes an opening to receive the adjustment mechanism;
 wherein the shaft extends through the brace and the netting;
 wherein the plurality of brace elements includes a first brace element, a second brace element, a third brace element, and a fourth brace element, wherein the first brace element, the second brace element, and the third brace element are connected to a first side of an interior surface of the frame and the shaft, wherein the fourth brace element is connected to a second side of the interior surface and the shaft, wherein the second side of the frame is on the opposite side of the frame relative to the first side of the frame;
 wherein the adjustment mechanism includes a locked position and an unlocked position, wherein in the locked position, the adjustment mechanism applies pressure to the mast and to the shaft;
 wherein the adjustment mechanism adjusts a height of the frame, the brace, and the netting;
 wherein the shaft is positioned around the mast;
 wherein, when the adjustment mechanism is in the locked position, the shaft is not movable along a length of the mast;
 wherein, when the adjustment mechanism is in the unlocked position, the shaft is movable along the length of the mast; and
 wherein, when the adjustment mechanism is in the locked position, the netting, the brace, and the shaft apply downward pressure onto the plant.

13. The plant blocking device of claim 12, wherein the adjustment mechanism includes a knob screw, wherein the knob screw fits through the opening in the shaft, wherein, when the adjustment mechanism is in the locked position, the knob screw is in contact with the mast.

* * * * *